(12) United States Patent
Jang et al.

(10) Patent No.: US 9,372,362 B2
(45) Date of Patent: Jun. 21, 2016

(54) LIQUID CRYSTAL DISPLAY

(71) Applicant: Samsung Display Co., Ltd., Yongin, Gyeonggi-Do (KR)

(72) Inventors: Jae-Soo Jang, Suwon-si (KR); Jang Wi Ryu, Seoul (KR); Cheol Shin, Hwaseong-si (KR); Hak Sun Chang, Yongin-si (KR); Ki Chul Shin, Seongnam-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 40 days.

(21) Appl. No.: 14/149,076

(22) Filed: Jan. 7, 2014

(65) Prior Publication Data
US 2015/0049289 A1    Feb. 19, 2015

(30) Foreign Application Priority Data
Aug. 14, 2013    (KR) .................. 10-2013-0096656

(51) Int. Cl.
*G02F 1/1337*    (2006.01)
*G02F 1/1343*    (2006.01)

(52) U.S. Cl.
CPC .... *G02F 1/133707* (2013.01); *G02F 1/134336* (2013.01); *G02F 2001/134318* (2013.01); *G02F 2001/134345* (2013.01)

(58) Field of Classification Search
CPC combination set(s) only.
See application file for complete search history.

(56) References Cited

U.S. PATENT DOCUMENTS

| | | | |
|---|---|---|---|
| 6,940,575 | B2 | 9/2005 | Sunohara et al. |
| 8,035,787 | B2 | 10/2011 | Jung et al. |
| 8,345,199 | B2 | 1/2013 | Hashimoto et al. |
| 2009/0103033 | A1* | 4/2009 | Chen et al. ............... 349/139 |
| 2010/0149448 | A1* | 6/2010 | Kim ......................... 349/42 |
| 2012/0274885 | A1 | 11/2012 | Shin et al. |
| 2014/0043571 | A1 | 2/2014 | Chang et al. |

FOREIGN PATENT DOCUMENTS

JP    4768040 B2    2/2005
KR    1020110111227 A    10/2011

\* cited by examiner

*Primary Examiner* — Wen-Ying P Chen
(74) *Attorney, Agent, or Firm* — Cantor Colburn LLP

(57) ABSTRACT

A liquid crystal display includes a first substrate, a plurality of pixel electrodes disposed on the first substrate and including a first sub-pixel electrode and a second sub-pixel electrode, the first sub-pixel electrode and the second sub-pixel electrode respectively including a cruciform stem part, and a plurality of fine branch parts which extends from the cruciform stem part, and a liquid crystal layer interposed between the first substrate and a second substrate facing the first substrate, the second substrate including a common electrode in which an opening corresponding to the cruciform stem part of the pixel electrode is defined.

17 Claims, 19 Drawing Sheets

LIQUID CRYSTAL DISPLAY

This application claims priority to Korean Patent Application No. 10-2013-0096656 filed on Aug. 14, 2013, and all the benefits accruing therefrom under 35 U.S.C. §119, the entire contents of which are incorporated herein by reference.

BACKGROUND (a) Field

The invention relates to a liquid crystal display.

(b) Description of the Related Art

A liquid crystal display ("LCD") is one of the flat panel displays which have been widely used and includes two sheets of display panels in which field generating electrodes, such as a pixel electrode and a common electrode, are formed and a liquid crystal layer interposed therebetween. The LCD generates an electric field in the liquid crystal layer by applying a voltage to a field generating electrode and displays an image by determining an alignment of liquid crystal molecules of the liquid crystal layer and controlling polarization of incident light based on the generated electric field.

Among the LCDs, an LCD in a vertically aligned mode in which major axes of the liquid crystal molecules are aligned to be vertical to the display panel in the state in which an electric field is not applied facilitates the implementation of a large contrast ratio and a wide reference viewing angle, and therefore has received attention.

In order to implement the wide viewing angle in the LCD in the vertically aligned mode, a plurality of domains having different alignments directions of the liquid crystal may be formed in one pixel.

As methods of forming the plurality of domains as described above, a method of forming a cut part, such as a fine slit, in the field generating electrode, a method for forming a protrusion on the field generating electrode, and the like are used. The method aligns the liquid crystal in a direction vertical to a fringe field by edges of the cut part or the protrusion and the fringe field formed between the field generating electrodes facing the edges, thereby forming the plurality of domains.

The LCD in the vertically aligned mode may have side visibility more effectively reduced than front visibility. To solve the problem, a method for dividing the one pixel into two sub-pixels and making voltages of the two sub-pixels different has been proposed.

SUMMARY

The invention provides a liquid crystal display ("LCD") having excellent visibility and transmittance, reduced texture, and improved color loss phenomenon and agglomeration phenomenon of grayscale while having a wide viewing angle and a quick response speed, by patterning a common electrode, thereby making a display quality excellent.

An exemplary embodiment of the invention provides an LCD including a first substrate, a plurality of pixel electrodes disposed on the first substrate and each including a first sub-pixel electrode and a second sub-pixel electrode, wherein each of the first and the second sub-pixel electrode includes a cruciform stem part and a plurality of fine branch parts which extends from the cruciform stem part, a second substrate facing the first substrate, a common electrode disposed on the second substrate, and an opening part defined in the common electrode and corresponding to the cruciform stem parts of the plurality of pixel electrodes, and a liquid crystal layer interposed between the first substrate and the second substrate.

In an exemplary embodiment, the LCD may further include a first alignment layer disposed on the first substrate, and a second alignment layer disposed on the second substrate, in which at least one of the first alignment layer, the second alignment layer, and the liquid crystal layer may include a photopolymerization material.

In an exemplary embodiment, the opening part defined in the common electrode includes a first opening corresponding to the cruciform stem part of the first sub-pixel electrode, and a second opening corresponding to the cruciform stem part of the second sub-pixel electrode.

In an exemplary embodiment, the opening part may be only vertically defined, corresponding to a vertical axis of the cruciform stem part of the first sub-pixel electrode.

In an exemplary embodiment, the opening part may be only vertically defined, corresponding to a vertical axis of the cruciform stem part of the second sub-pixel electrode.

In an exemplary embodiment, the first opening and the second opening may each have a cruciform shape, corresponding to the cruciform stem parts of the first and second sub-pixel electrodes, respectively.

In an exemplary embodiment, the first opening may be only vertically defined, corresponding to a vertical axis of the cruciform stem part of the first sub-pixel electrode, and the second opening may have the cruciform shape, corresponding to the cruciform stem part of the second sub-pixel electrode.

In an exemplary embodiment, the first opening and the second opening may be only vertically defined, corresponding to vertical axes of the cruciform stem parts of the first and second sub-pixel electrodes, respectively.

In an exemplary embodiment, the first opening may be only vertically defined, corresponding to a vertical axis of the cruciform stem part of the first sub-pixel electrode, and the second opening may be only horizontally defined, corresponding to a horizontal axis of the cruciform stem part of the second sub-pixel electrode.

In an exemplary embodiment, the first opening and the second opening may each have a cruciform shape corresponding to the cruciform stem parts of the first sub-pixel electrode and the second sub-pixel electrode, respectively. For one of the first and second openings, a width of the one opening along the horizontal axis, taken perpendicular to an elongation direction of the one opening along the horizontal axis, and a width of the one opening along a vertical axis, taken perpendicular to an elongation direction of the one opening along the vertical axis, are different from each other.

In an exemplary embodiment, the width of the first opening having the cruciform shape corresponds to the cruciform stem part of the first sub-pixel electrode, the width of the first opening along the vertical axis is larger than the width of the first opening along the horizontal axis, and the second opening having the cruciform shape corresponds to the cruciform stem part of the second sub-pixel electrode.

In an exemplary embodiment, the first opening and the second opening may each include a plurality of discrete sub-openings arranged along vertical axes, corresponding to the vertical axes of the cruciform stem parts of the first and second sub-pixel electrodes, respectively.

In an exemplary embodiment, widths of the first opening and the second opening, respectively taken perpendicular to an elongated direction of the first opening and the second opening, may be three times smaller than a cell interval of the liquid crystal layer.

In an exemplary embodiment, the widths of the first opening and the second opening may be about 2 micrometers (μm) to about 5 μm.

In an exemplary embodiment, a basic region of the first sub-pixel electrode or the second sub-pixel electrode may be plural in one pixel As set forth above, according to the LCD according to the exemplary embodiments of the invention, the slit (e.g., opening) is provided so that the cruciform stem portion and the fine branch portion extending from the stem portion is disposed in the pixel electrode, and the slit of the common electrode is patterned at the position corresponding to the stem portion of the pixel electrode, thereby making the visibility and the transmittance excellent, reducing the texture, and improving the color loss phenomenon and the agglomeration phenomenon of grayscale.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
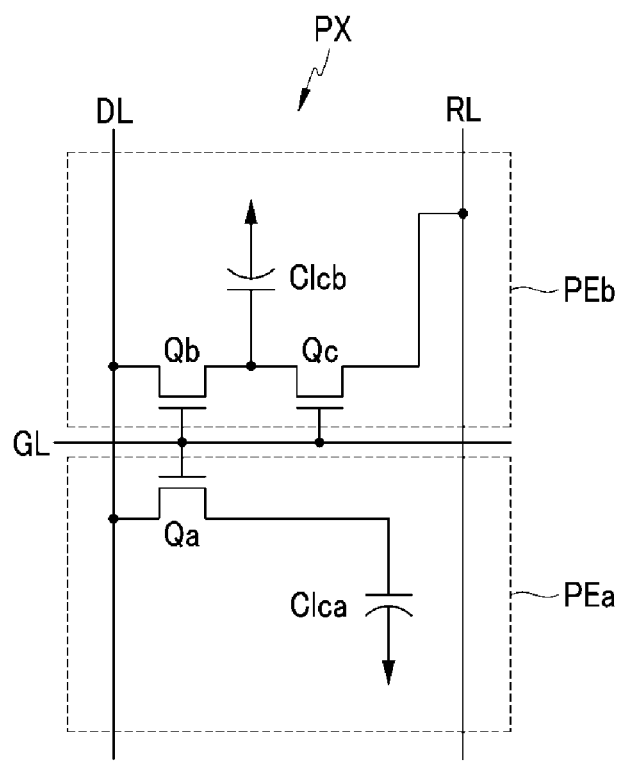
FIG. 1 is an equivalent circuit diagram of an exemplary embodiment of one pixel of a liquid crystal display ("LCD") according to the invention.

The invention will be described more fully hereinafter with reference to the accompanying drawings, in which exemplary embodiments of the invention are shown. As those skilled in the art would realize, the described exemplary embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

First, an arrangement of signal lines and pixels of a liquid crystal display ("LCD") and a driving method thereof according to an exemplary embodiment of the invention will be described with reference to FIG. 1.

FIG. 1 is an equivalent circuit diagram of one pixel of a LCD according to the exemplary embodiment of the invention.

Referring to FIG. 1, one pixel PX of the LCD according to the exemplary embodiment of the invention includes a plurality of signal lines which includes a gate line GL transferring a gate signal, a data line DL transferring a data signal, and a voltage dividing reference voltage line RL which transfers voltage dividing reference voltage, first, second, and third switching elements Qa, Qb, and Qc which are connected to the plurality of signal lines, and first and second liquid crystal capacitors Clca and Clcb.

The first and second switching elements Qa and Qb are each connected to the gate line GL and the data line DL and the third switching element Qc is connected to an output terminal of the second switching element Qb and the voltage dividing reference line RL The first and second switching elements Qa and Qb are each a three terminal element, such as a thin film transistor ("TFT"), and control terminals thereof are connected to the gate line GL and input terminals thereof are connected to the data line DL, an output terminal of the first switching element Qa is connected to the first liquid crystal capacitor Clca and an output terminal of the second switching element Qb is connected to input terminals of the second liquid crystal capacitor Clcb and the third switching element Qc.

The third switching element Qc is also the three terminal element, such as the TFT, and a control terminal thereof is connected to the gate line GL, an input terminal thereof is connected to the second liquid crystal capacitor Clcb, and an output terminal thereof is connected to the voltage dividing reference voltage line RL.

When a gate on signal is applied to the gate line GL, the first, second, and third switching elements Qa, Qb, and Qc which are connected to the gate line GL are turned on. Therefore, a data voltage applied to the data line DL is applied to a first sub-pixel electrode PEa and a second sub-pixel electrode PEb through the first and second switching elements Qa and Qb which are turned on, respectively. In this case, the data voltage which is applied to the first sub-pixel electrode PEa and the second sub-pixel electrode PEb is the same and the first and second liquid crystal capacitors Clca and Clcb are charged with the same value as a difference between a common voltage and the data voltage. At the same time, a voltage charged in the second liquid crystal capacitor Clcb is divided by the third switching element Qc. As a result, a voltage value which is charged in the second liquid crystal capacitor Clcb is lowered by a difference between the common voltage and the voltage division reference voltage. That is, the voltage which is charged in the first liquid crystal capacitor Clca is higher than the voltage which is charged in the second liquid crystal capacitor Clcb.

As such, the voltage which is charged in the first liquid crystal capacitor Clca and the voltage which is charged in the second liquid crystal capacitor Clcb are different from each other. Since the voltage of the first liquid crystal capacitor Clca and the voltage of the second liquid crystal capacitor Clcb are different from each other, inclined angles of liquid crystal molecules in the first sub-pixel and the second sub-pixel are different from each other, and thus a luminance of the first sub-pixel and the luminance of the second sub-pixel are different from each other. Therefore, when the voltage of the first liquid crystal capacitor Clca and the voltage of the second liquid crystal capacitor Clcb are appropriately controlled, an image viewed from a side may maximally approach an image viewed from a front, thereby improving side visibility.

In order to make the voltage charged in the first liquid crystal capacitor Clca and the voltage charged in the second liquid crystal capacitor Clcb different from each other, the illustrated exemplary embodiment of the invention includes the second liquid crystal capacitor Clcb and the third switching element Qc connected to the voltage division reference voltage line RL, but in another exemplary embodiment of the invention, the second liquid crystal capacitor Clcb may also be connected to a step-down capacitor. In detail, one pixel PX of the LCD includes the third switching element which includes a first terminal connected to a step-down gate line, a second terminal connected to the second liquid crystal capacitor Clcb, and a third terminal connected to the step-down capacitor to charge a portion of electric charges charged in the second liquid crystal capacitor Clcb in the step-down capacitor, thereby making the charging voltage between the first liquid crystal capacitor Clca and the second liquid crystal capacitor Clcb different. Further, in the case of the LCD according to another exemplary embodiment of the invention, the first and second liquid crystal capacitors Clca and Clcb are connected to different data lines to be applied with different data voltages, thereby making a charging voltage between the first and second liquid crystal capacitors Clca and Clcb differently set. In addition, the charging voltage between the first and second liquid crystal capacitors Clca and Clcb may be differently set by other several methods.

Figure 2:
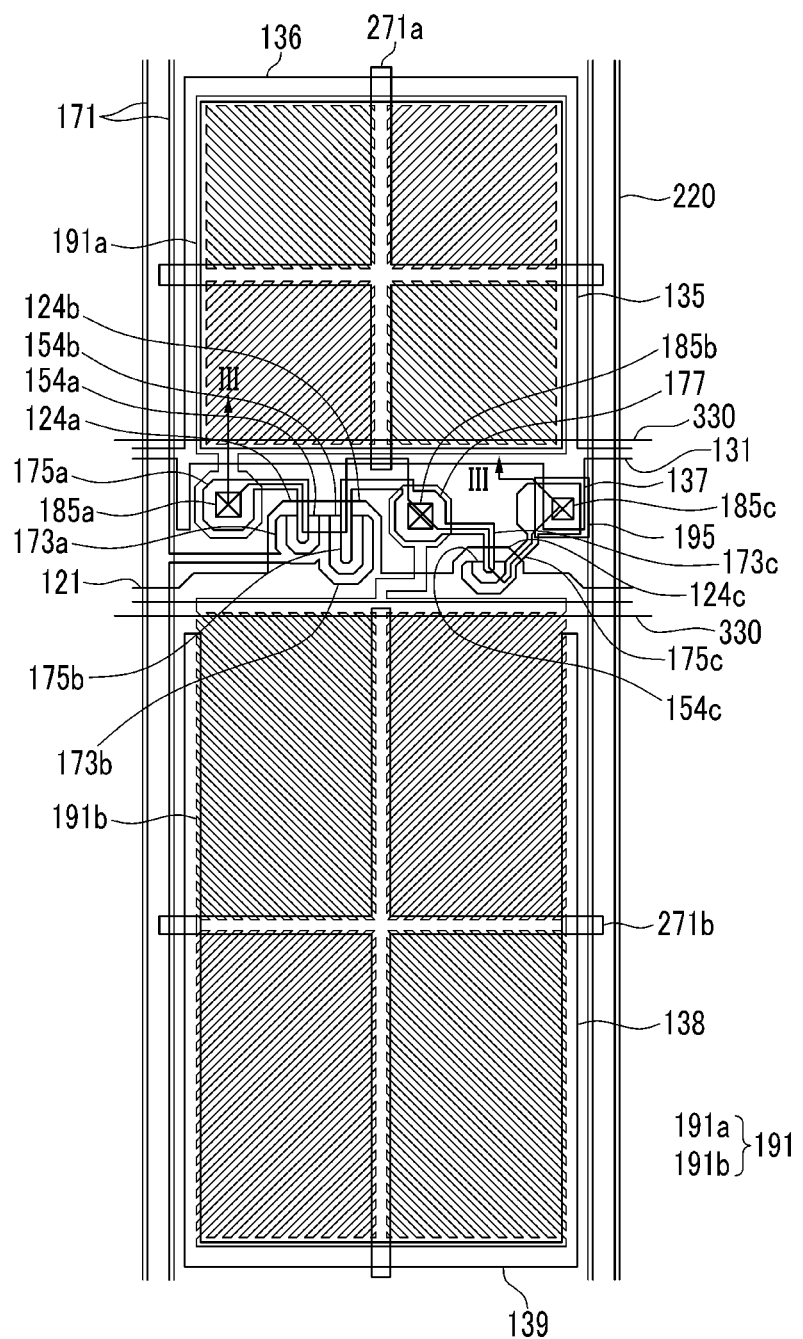
FIG. 2 is a plan view of an exemplary embodiment of the one pixel of the LCD according to the invention.

Next, a structure of the LCD according to the exemplary embodiment of the invention illustrated in FIG. 1 will be described in detail with reference to FIGS. 2 and 3. FIG. 2 is a plan view of an exemplary embodiment of one pixel of the LCD according to the exemplary embodiment of the invention and FIG. 3 is a cross-sectional view of the LCD taken along line III-III of FIG. 2.

Figure 3:
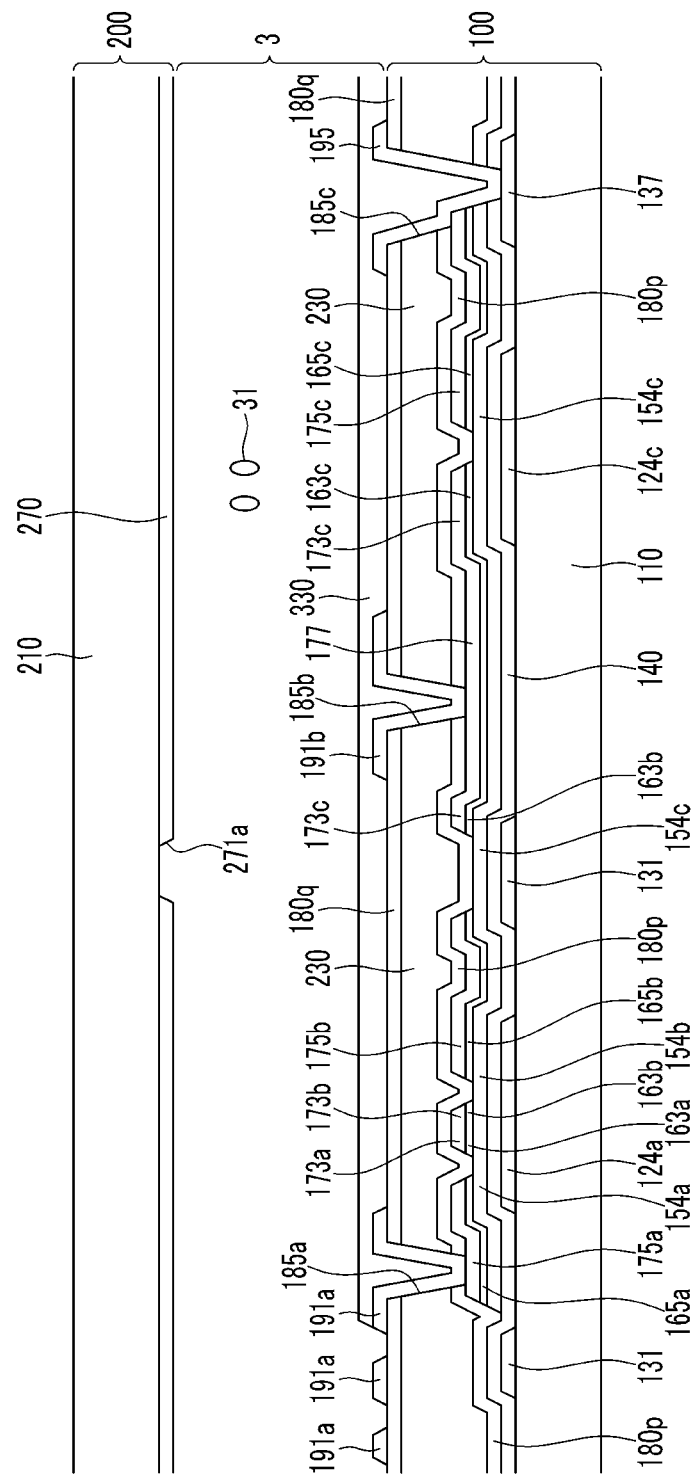
FIG. 3 is a cross-sectional view of the LCD taken along line III-III of FIG. 2.

First, referring to FIGS. 2 and 3, the LCD according to the exemplary embodiment of the invention includes a lower display panel 100 and an upper display panel 200 facing each other, a liquid crystal layer 3 interposed between the two display panels 100 and 200, an a pair of polarizers (not illustrated) which is attached to an outer surface of the lower and upper display panels 100 and 200.

First, the lower panel 100 will be described.

A gate conductor which includes a gate line 121 and a voltage division reference voltage line 131 is disposed on an insulating substrate 110 including transparent glass, plastic, or the like.

The gate line 121 includes a wide end (not illustrated) for connection with a first gate electrode 124a, a second gate electrode 124b, a third gate electrode 124c, and another layer or an external driving circuit.

The voltage division reference voltage line 131 includes first storage electrodes 135 and 136 and a reference electrode 137. Second storage electrodes 138 and 139, which are not connected to the voltage dividing reference voltage line 131 but overlap a second sub-pixel electrode 191b, are positioned.

A gate insulating layer 140 is disposed on the gate line 121 and the voltage dividing reference voltage line 131.

A first semiconductor 154a, a second semiconductor 154b, and a third semiconductor 154c are disposed on the gate insulating layer 140.

A plurality of ohmic contacts 163a, 165a, 163b, 165b, 163c, and 165c is disposed on the semiconductors 154a, 154b, and 154c.

A plurality of data lines 171 including a first source electrode 173a and a second source electrode 173b and a data conductor including a first drain electrode 175a, a second drain electrode 175b, a third source electrode 173a, and a third drain electrode 175c are disposed on the ohmic contacts 163a, 165a, 163b, 165b, 163c, and 165c and the gate insulating layer 140.

The data conductor, the semiconductor positioned therebeneath, and the ohmic contact may be simultaneously provided using a single mask.

The data line 171 includes a wide end (not illustrated) for connection with another layer or an external driving circuit.

The first gate electrode 124a, the first source electrode 173a, and the first drain electrode 175a form a first TFT Qa, along with a first semiconductor island 154a and a channel of the TFT is disposed on the semiconductor 154a between the first source electrode 173a and the first drain electrode 175a. Similarly, the second gate electrode 124b, the second source electrode 173b, and the second drain electrode 175b form one second TFT Qb, along with a second semiconductor island 154b, the channel is disposed on the semiconductor 154b between the second source electrode 173b and the second drain electrode 175b, the third gate electrode 124c, the third source electrode 173c, and the third drain electrode 175c form(s) one third TFT Qc, along with the third semiconductor island 154c, and the channel is disposed on the semiconductor 154c between the third source electrode 173c and the third drain electrode 175c.

The second drain electrode 175b is connected to the third source electrode 173c and includes a wide expansion 177.

A first passivation layer 180p is disposed on the data conductors 171, 173c, 175a, 175b, and 175c and the exposed semiconductors 154a, 154b, and 154c. The first passivation layer 180p may include an inorganic insulating layer including silicon nitride, silicon oxide, or the like. The first passivation layer 180p may effectively prevent a pigment of a color filter 230 from flowing in the exposed semiconductors 154a, 154b, and 154c.

The color filter 230 is disposed on the first passivation layer 180p. The color filter 230 extends in a vertical direction along two data lines which are adjacent to each other. A first light blocking member 220 is positioned on the first passivation layer 180p, the edge of the color filter 230, and the data line 171.

The first light blocking member 220 extends along the data line 171 and is positioned between the two adjacent color filters 230. A width of the first light blocking member 220 taken along a direction perpendicular to an elongated direction thereof in a plan view may be larger than that of the data line 171 taken along the direction perpendicular to the elongated direction thereof in the plan view. As such, the width of the first light blocking member 220 is provided to be larger than that of the data line 171, such that the first light blocking member 220 may effectively prevent the light incident from the outside from reflecting from a surface of the data line 171. Therefore, the light reflected from the surface of the data line 171 interferes with the light transmitting the liquid crystal layer 3, thereby effectively preventing a contrast ratio of the LCD from deteriorating.

A second passivation layer 180q is disposed on the color filter 230 and the first light blocking member 230.

In an exemplary embodiment, the second passivation layer 180q may include an inorganic insulating layer including silicon nitride, silicon oxide, or the like. The second passivation layer 180q effectively prevents the color filter 230 from lifting and suppresses a pollution of the liquid crystal layer 3 due to organic materials, such as a solvent inflowing from the color filter 230, thereby effectively preventing defects, such as an afterimage which may occur at the time of driving the screen, from occurring.

A first contact hole 185a and a second contact hole 185b, which expose the first drain electrode 175a and the second drain electrode 175b, are defined in the first passivation layer 180p and the second passivation layer 180q, respectively.

A third contact hole 185c, which exposes a portion of a reference electrode 137 and a portion of the third drain electrode 175c, is defined in the first passivation layer 180p and the second passivation layer 180q, in which the third contact hole 185c is covered with a connection member 195. The connection member 195 electrically connects between the reference electrode 137 and the third drain electrode 175c which are exposed through the third contact hole 185c.

A plurality of pixel electrodes 191 is disposed on the second passivation layer 180q. Each of the pixel electrodes 191 are separated from each other, having the gate line 121 disposed therebetween and includes the first sub-pixel electrode 191a and the second sub-pixel electrode 191b which are adjacent to each other in a column direction based on the gate line 121. In an exemplary embodiment, the pixel electrode 191 may include transparent materials, such as indium tin oxide ("ITO") and indium zinc oxide ("IZO"). In an exemplary embodiment, the pixel electrode 191 may also include transparent conductive materials, such as ITO and IZO or reflective metals, such as aluminum, silver, chromium, or an alloy thereof.

Figure 4:
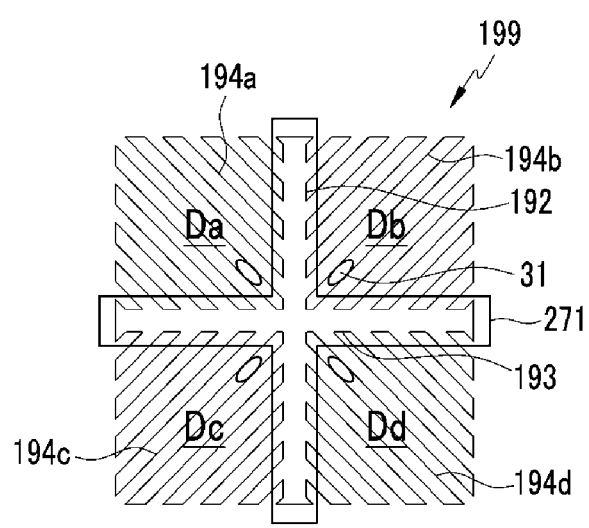
FIG. 4 is a diagram illustrating a basic structure of the pixel of FIG. 2.

The first sub-pixel electrode 191a and the second sub-pixel electrode 191b each include a basic electrode 199 or at least one deformation thereof as illustrated in FIG. 4.

The first sub-pixel electrode 191a and the second sub-pixel electrode 191b are physically and electrically connected to the first drain electrode 175a and the second drain electrode 175b, respectively, through the first and second contact holes 185a and 185b and are applied with a data voltage from the first drain electrode 175a and the second drain electrode 175b. In this case, the data voltage applied to the second drain electrode 175b is divided by the third source electrode 173c, such that a magnitude of the voltage applied to the first sub-pixel electrode 191a may be larger than that of the voltage applied to the second sub-pixel electrode 191b.

The first sub-pixel electrode 191a and the second sub-pixel electrode 191b to which the data voltage is applied generate an electric field, along with a common electrode 270 of the upper display panel 200, thereby determining an alignment of liquid crystal molecules of the liquid crystal layer 3 between the two electrodes 191 and 270. A luminance of light passing through the liquid crystal layer 3 along the alignment of the liquid crystal molecules determined as described above is changed.

A second light blocking member 330 is positioned on the pixel electrode 191. The second light blocking member 330 covers the overall region in which the first transistor Qa, the second transistor Qb, the third transistor Qc, and the first to third contact holes 185a, 185b, and 185c are positioned and extends in the same direction as the gate line 121 to overlap a portion of the data line 171. The second light blocking member 330 is positioned to at least partially overlap the two data lines 171 which are positioned at both end sides of one pixel region to be able to effectively prevent light from leaking which may occur around the data line 171 and the gate line 121 and effectively prevent light from leaking at a region in which the first transistor Qa, the second transistor Qb, and the third transistor Qc are positioned.

Prior to providing the second light blocking member 330, the first passivation layer 180p, the color filter 230, and the second passivation layer 180q are positioned in the region in which the first transistor Qa, the second transistor Qb, the third transistor Qc, and the first to third contact holes 185a, 185b, and 185c are positioned, thereby easily identifying the positions of the first transistor Qa, the second transistor Qb, the third transistor Qc, and the first to third contact holes 185a, 185b, and 185c.

Next, the upper panel 200 will be described.

The common electrode 270 is disposed on the insulating substrate 210. Referring to FIG. 2, the common electrode 270 has a plurality of cut parts 271a and 271b.

Referring to FIG. 2, the first cut part 271a of the common electrode 270 is defined in a position corresponding to the first sub-pixel electrode 191a and the second cut part 271b is defined in a position corresponding to the second sub-pixel electrode 191b.

In an exemplary embodiment, when viewing the first and second cut parts 271a and 271b from the top, the first and second cutouts 271a and 271b may have a cruciform shape and edges thereof further protrude more than those of the first and second sub-pixel electrodes 191a and 191b. As such, the edge of the cut part of the common electrode 270 is provided to further protrude more than that of the pixel electrode to have a stable effect of a horizontal electric field on the edge of the pixel region, thereby controlling the alignment of the liquid crystal molecules in a desired direction even in the edge of the pixel region.

The widths of the first and second cut parts 271a and 271b may be preferably set to be about three times smaller than the thickness of the liquid crystal layer 3, that is, a cell interval, about 2 micrometers (μm) to about 5 μm.

The first sub-pixel electrode 191a and the second sub-pixel electrode 191b may be divided into the plurality of sub-pixel regions defined by the first and second cut parts 271a and 271b and the first and second sub-pixel electrodes 191a and 191b.

An upper alignment layer (not illustrated) is disposed on the common electrode 270. In an exemplary embodiment, the upper alignment layer may be a vertical alignment layer and may be an alignment layer which is photo-aligned by a photopolymerization material.

In an exemplary embodiment, a polarizer (not illustrated) is disposed on an outer surface of the two display panels 100 and 200 and transmission axes of the two polarizers are crossed to each other, in which one of the transmission axes is preferably parallel with the gate line 121. However, the invention is not limited thereto and the polarizer may also be disposed only on the outer surface of any one of the two display panels 100 and 200.

The liquid crystal layer 3 has a negative dielectric anisotropy and the liquid crystal molecules of the liquid crystal layer 3 are aligned so that a major axis thereof is vertical to the surfaces of the two display panels 100 and 200 in the state in which no electric field is present. Therefore, the incident light does not pass through the crossed polarizers but is blocked, in the state in which no electric field is present.

As described above, the first sub-pixel electrode 191a and the second sub-pixel electrode 191b to which the data voltage is applied generate an electric field, along with the common electrode 270 of the common electrode display panel 200, such that the liquid crystal molecules of the liquid crystal layer 3 aligned to be vertical to the surfaces of the two electrodes 191 and 270 in the state in which no electric field is present rotate to the horizontal direction with respect to the surfaces of the two electrodes 191 and 270 and the luminance of light transmitting the liquid crystal layer 3 depending on the laid degree of the liquid crystal molecules may be changed.

Next, the basic electrode 199 will be described with reference to FIG. 4.

FIG. 4 is a diagram illustrating a basic structure of the pixel of FIG. 2.

As illustrated in FIG. 4, the basic electrode 199 of the field generating electrode includes the pixel electrode 191 which faces an opening 271 of the common electrode 270 (refers to FIG. 3).

The overall shape of the basic electrode 199 is a quadrangle and includes a cruciform stem part which is configured to include a horizontal stem part 193 and a vertical stem part 192 orthogonal thereto. Further, the basic electrode 199 is divided into a first sub-region Da, a second sub-region Db, a third sub-region Dc, and a fourth sub-region Dd by the horizontal stem part 193 and the vertical stem part 192, in which each sub-region Da to Dd includes a plurality of first fine branch parts 194a, a plurality of second fine branch parts 194b, a plurality of third fine branch parts 194c, and a plurality of fourth fine branch parts 194d.

When viewing the LCD from the top, the plurality of small regions which are defined by the opening 271 of the common electrode 270 and the edge of the pixel electrode 191 may be symmetrical to each other based on the opening 271 of the common electrode 270.

The first fine branch part 194a of the pixel electrode 191 obliquely extends left up from the horizontal stem part 193 or the vertical stem part 192 and the second fine branch part 194b obliquely extends right up from the horizontal stem part 193 or the vertical stem part 192. Further, the third fine branch part 194c extends left down from the horizontal stem part 193 or the vertical stem part 192 and the fourth fine branch part 194d obliquely extends right down from the horizontal stem part 193 or the vertical stem part 192.

The first to fourth fine branch parts 194a, 194b, 194c, and 194d form an angle of approximately 45° or approximately 135° with respect to the gate line 121a and 121b or the horizontal stem part 193. Further, the fine branch parts 194a, 194b, 194c, and 194d of the two neighboring sub-pixel regions Da, Db, Dc, and Db may be orthogonal to each other.

Widths of the fine branch parts 194a, 194b, 194c, and 194d may be about 2.5 μm to about 5.0 μm and an interval between the adjacent fine branch parts 194a, 194b, 194c, and 194d within one sub-pixel region Da, Db, Dc, and Dd may be about 2.5 μm to about 5.0 μm.

According to another exemplary embodiment of the invention, the widths of the fine branch parts 194a, 194b, 194c, and 194d may be widened toward the horizontal stem part 193 or the vertical stem part 192 and a difference between a portion having the widest width and a portion having the narrowest width in one of the fine branch parts 194a, 194b, 194c, and 194d may be about 0.2 μm to about 1.5 μm.

The first sub-pixel electrode 191a and the second sub-pixel electrode 191b are connected to the first drain electrode 175a or the second drain electrode 175b, respectively, through the first and second contact holes 185a and 186b and are applied with a data voltage from the first drain electrode 175a and the second drain electrode 175b. In this case, sides of the first to fourth fine branch parts 194a, 194b, 194c, and 194d distort an electric field to generate a horizontal component which determines an inclined direction of the liquid crystal molecules 31. The horizontal component of the electric field is substantially horizontal to the sides of the first to fourth fine branch parts 194a, 194b, 194c, and 194d. Therefore, as illustrated in FIG. 4, the liquid crystal molecules 31 are inclined in a direction parallel with a length direction of the fine branch parts 194a, 194b, 194c, and 194d. The one pixel electrode 191 includes the four sub-pixel regions Da, Db, Dc, and Dd in which the length directions of the fine branches 194a, 194b, 194c, and 194d are different from each other, and therefore the direction in which the liquid crystal molecules 31 are inclined is approximately four directions and the liquid crystal layer 3 is provided with four domains in which the alignment directions of the liquid crystal 31 are different.

Further, as described above, which viewing the cut part 271 of the common electrode 270 from the top, the cut part 271 of the common electrode 270 may have a cruciform shape or a straight shape, such as the vertical axis and the horizontal axis and the edge of the cut part 271 further protrudes more than that of the corresponding pixel electrode 191. A width of the cut part 271 of the common electrode 270 may be about 2 μm to about 5 μm.

The width of the cut part 271 having a cruciform shape may be preferably set to be about three times smaller than the thickness of the liquid crystal layer 3, that is, the cell interval, more preferably about 2 μm to about 5 μm.

In the case of the LCD according to the exemplary embodiment of the invention, the cut part of the common electrode is defined in the common electrode but may be provided in at least one of the pixel electrode, which is the field generating electrode, and the common electrode. In detail, the cut part may be defined in the pixel electrode and may also be in both of the pixel electrode and the common electrode.

As such, when the direction in which the liquid crystal molecules are inclined is various, a reference viewing angle of the LCD is increased.

Next, a method of initially aligning the liquid crystal molecule 31 so as to have a pretilt will be described with reference to FIG. 5.

Figure 5:
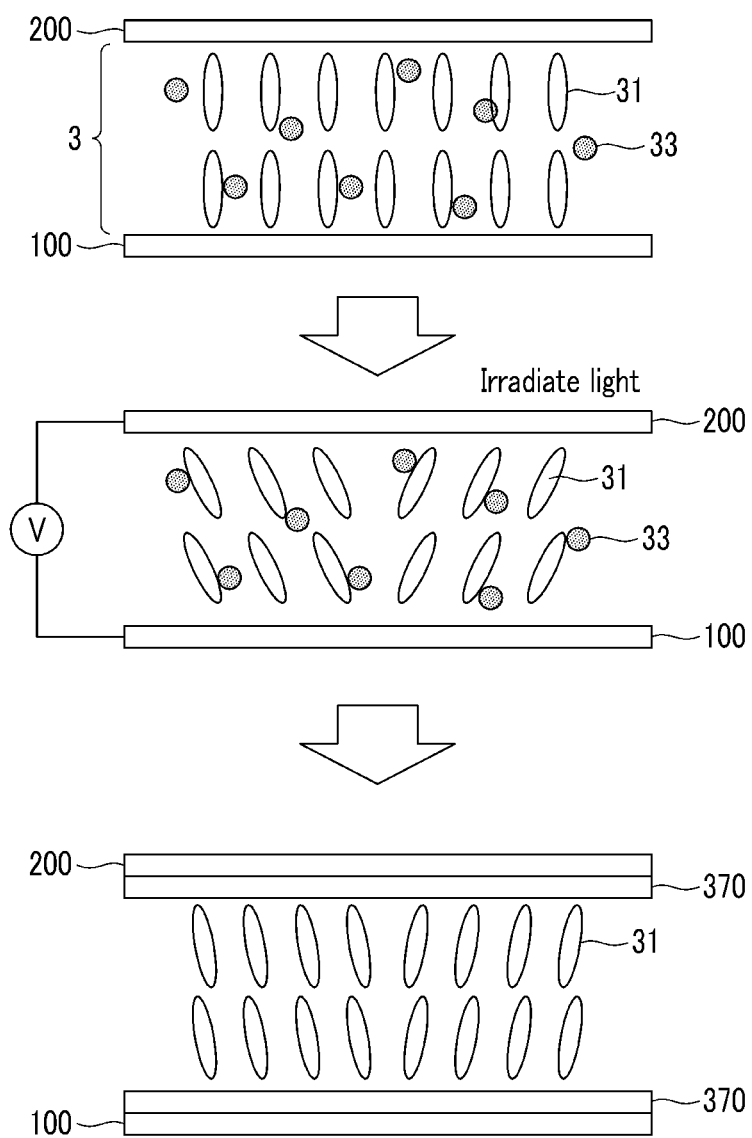
FIG. 5 is a diagram illustrating a process of allowing liquid crystal molecules to have a pretilt using a prepolymer which is polymerized by light such as ultraviolet rays.

FIG. 5 is a diagram illustrating a process of allowing liquid crystal molecules to have a pretilt using a prepolymer which is polymerized by light such as ultraviolet rays.

First, a prepolymer 33, such as a monomer which is cured by polymerization due to light, such as ultraviolet rays, is injected between the two display panels 100 and 200, along with the liquid crystal material. In an exemplary embodiment, the prepolymer 33 may be reactive mesogen which performs the polymerization reaction by light, such as ultraviolet rays.

Next, the electric field is generated in the liquid crystal layer 3 between the two display panels 100 and 200 by applying the data voltage to the first sub-pixel electrode 191a and the second sub-pixel electrode 191b and applying the common voltage to the common electrode 270 of the upper display panel 200. Next, liquid crystal molecules 31 of the liquid crystal layer 3 are inclined in a direction parallel with the length directions of the fine branch parts 194a, 194b, 194c, and 194d through the two steps as described above in response to the electric field and the direction in which the liquid crystal molecules 31 are inclined in one pixel is a total of four directions.

Further, the liquid crystal molecules of the lower portions of the cut parts 271a and 271b of the common electrode 270 are aligned in a direction orthogonal to the cut parts 271a and 271b of the common electrode to be able to effectively prevent light from leaking through the first and second cut parts 271a and 271b of the common electrode 270.

When the electric field is generated in the liquid crystal layer 3 and then the light, such as ultraviolet rays, is irradiated thereto, the prepolymer 33 is subjected to the polymerization reaction to provide a polymer 370 as illustrated in FIG. 5. The polymer 370 is provided by contacting the display panels 100 and 200. The alignment direction of the liquid crystal molecules 31 is defined by the polymer 370 to have the pretilt in the direction as described above. Therefore, the liquid crystal molecules 31 are aligned to have the pretilt in four different directions even in the state in which a voltage is not applied to the field generating electrodes 191 and 270.

The following experiment was performed to measure the change in transmittance and visibility of the LCD as illustrated in FIG. 2.

The change in transmittance and visibility of the LCD was measured by comparing the LCD in which the first cut part 271a of the common electrode 270 of FIG. 2 is defined in the position corresponding to the first sub-pixel electrode 191a and the second cut part 271b thereof is defined in the position corresponding to the second sub-pixel electrode 191b with the LCD in which the cut part 271 is not defined in the common electrode 270.

Figure 6:
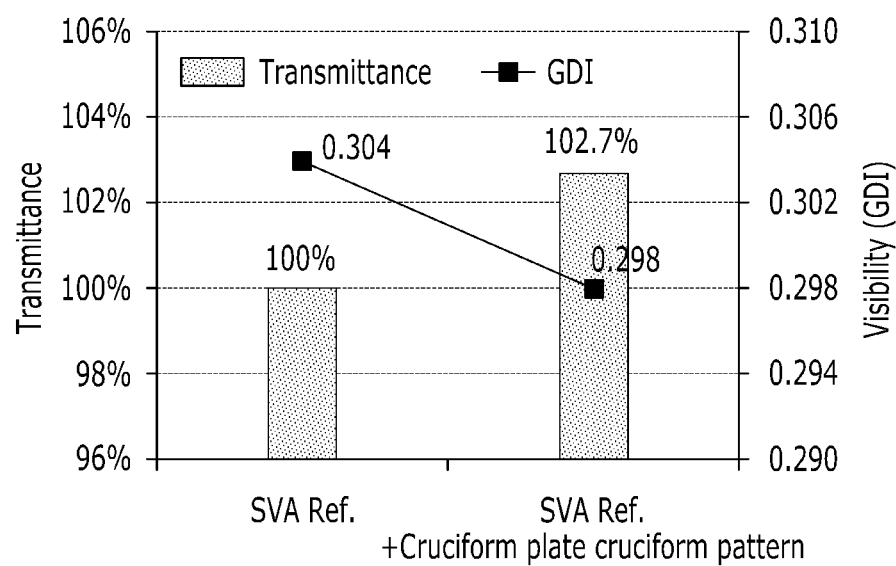
FIG. 6 is a graph illustrating a result obtained by measuring transmittance and visibility of the LCD of FIG. 2.

FIG. 6 is a graph illustrating the result obtained by measuring the transmittance and the visibility of the LCD of FIG. 2.

As illustrated in FIG. 6, the exemplary embodiment of the LCD illustrated in FIG. 2A according to the invention has transmittance which is increased as much as about 2.7% and has a visibility index which is reduced as many as about 0.006, as compared with the LCD in which the cut part 271 is not defined in the common electrode 270.

Various other exemplary embodiments of the cut parts 271a and 271b of the common electrode 270 of FIG. 2 will be described with reference to FIGS. 7 to 13.

Figure 7:
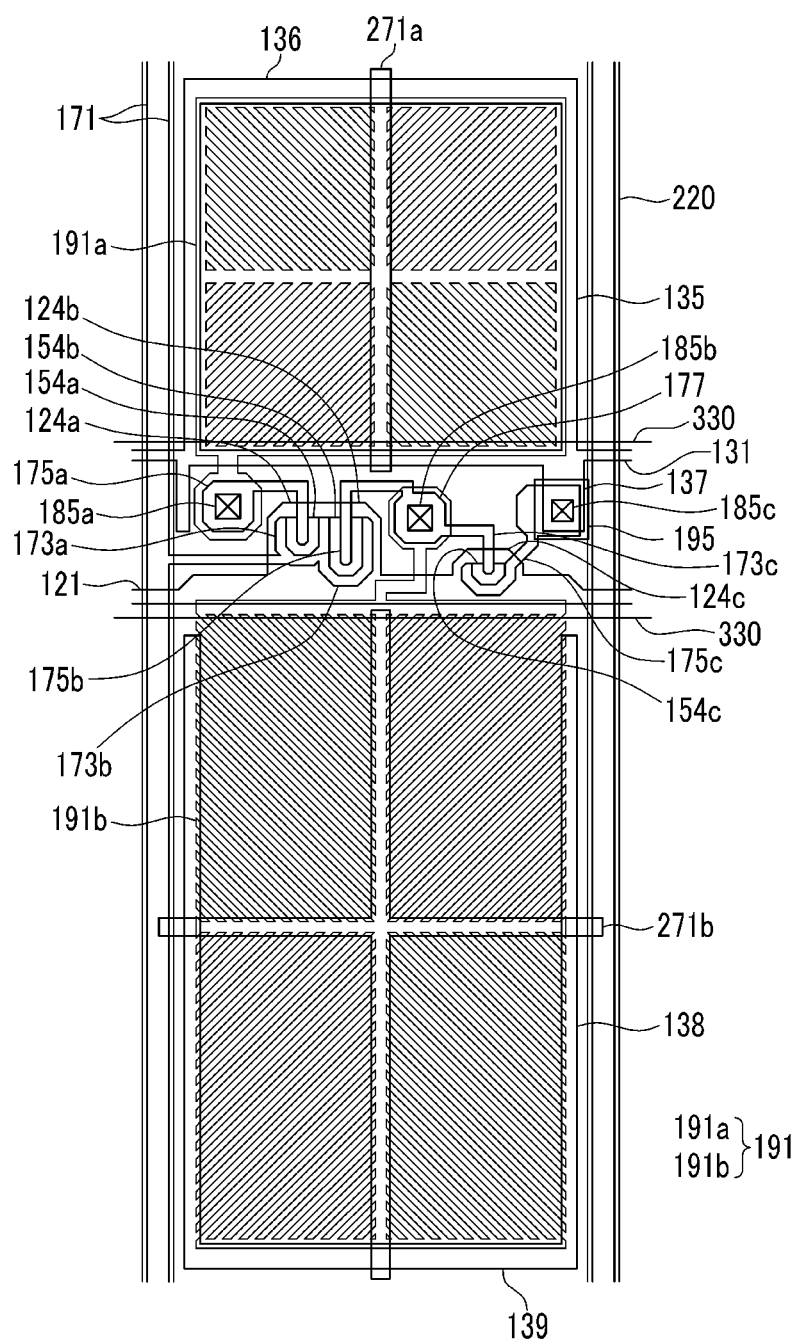
FIGS. 7 to 13 are plan views of another exemplary embodiment of the plan view of the one pixel of the LCD of FIG. 2.

FIG. 7 illustrates that when viewed from the top, the first cut part 271a of the first sub-pixel electrode 191a is defined only in the vertical axis direction, not having the cruciform shape and the second cut part 271b of the second sub-pixel electrode 191b has the cruciform shape.

The following experiment was performed to measure the change in transmittance and visibility of the LCD as illustrated in FIG. 7.

When viewing from the top, the change in transmittance and visibility was measured by comparing the LCD in which the first cut part 271a of the first sub-pixel electrode 191a of FIG. 7 is defined only in the vertical axis direction, not having the cruciform shape and the second cut part 271b of the second sub-pixel electrode 191b has the cruciform shape with the LCD in which the cut part 271 is not defined in the common electrode 270.

Figure 14:
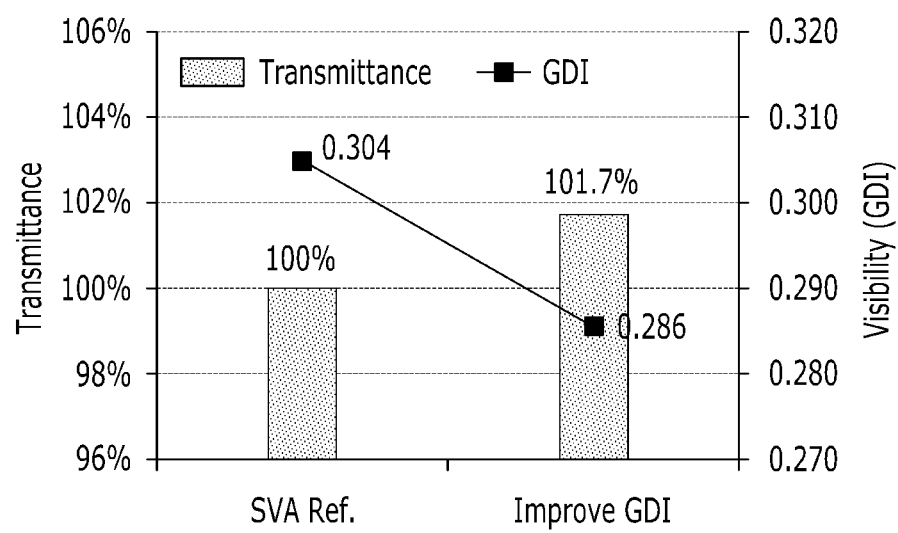
FIG. 14 is a graph illustrating the result obtained by measuring the transmittance and the visibility of the LCD of FIG. 7.
Figure 15:
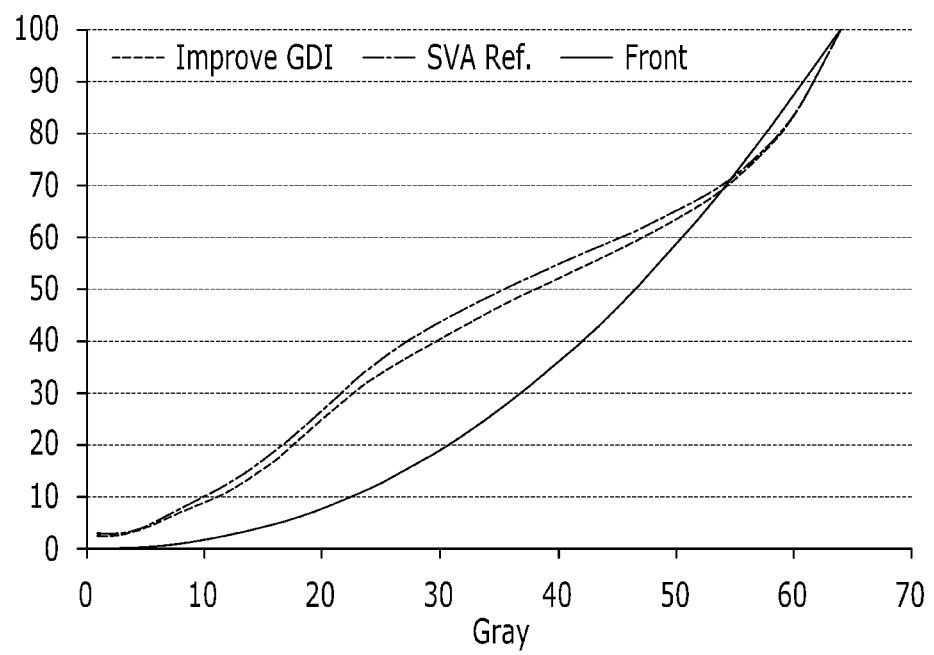
FIG. 15 is a diagram illustrating a gamma curve of the LCD of FIG. 7.

The results are illustrated in FIGS. 14 and 15.

As illustrated in FIG. 14, the LCD illustrated in FIG. 7 of the exemplary embodiment of the invention has transmittance which is increased as much as about 1.7% and has a visibility index which is reduced as many as about 0.018, as compared with the LCD in which the cut part 271 is not defined in the common electrode 270.

Further, as illustrated in FIG. 15, an effect of downing a side gamma curve as a whole appears.

Figure 8:
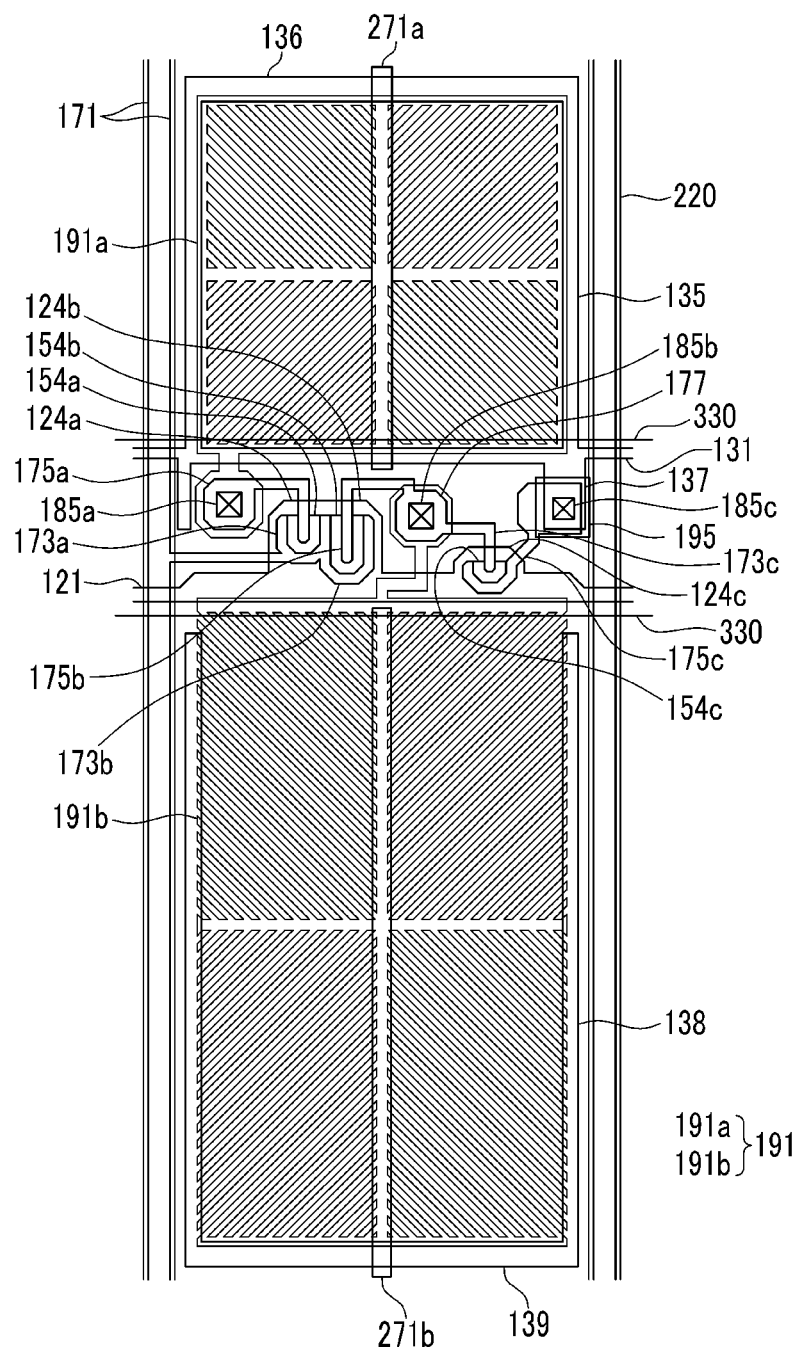

FIG. 8 illustrates that when viewing from the top, the first cut part 271a of the first sub-pixel electrode 191a is defined only in the vertical axis direction, not having the cruciform shape and the second cut part 271b of the second sub-pixel electrode 191b is also defined only in the vertical axis direction, not having the cruciform shape.

The following experiment was performed to measure the change in transmittance and visibility of the LCD as illustrated in FIG. 8.

When viewing from the top, the change in transmittance and visibility was measured by comparing the LCD in which the first cut part 271a of the first sub-pixel electrode 191a of FIG. 8 is defined only in the vertical axis direction, not having the cruciform shape and the second cut part 271b of the second sub-pixel electrode 191b is also defined only in the vertical axis direction, not having the cruciform shape with the LCD in which the cut part 271 is not defined in the common electrode 270.

Figure 16:
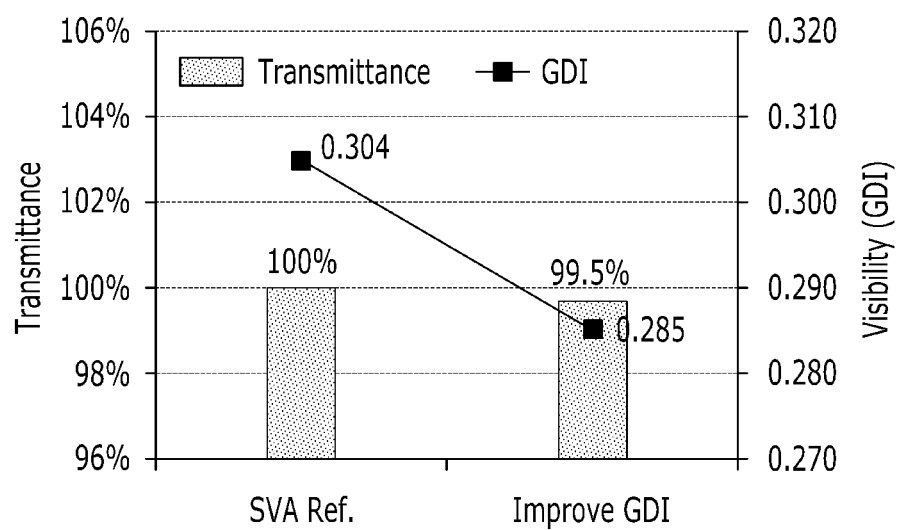
FIG. 16 is a graph illustrating the result obtained by measuring the transmittance and the visibility of the LCD of FIG. 8.
Figure 17:
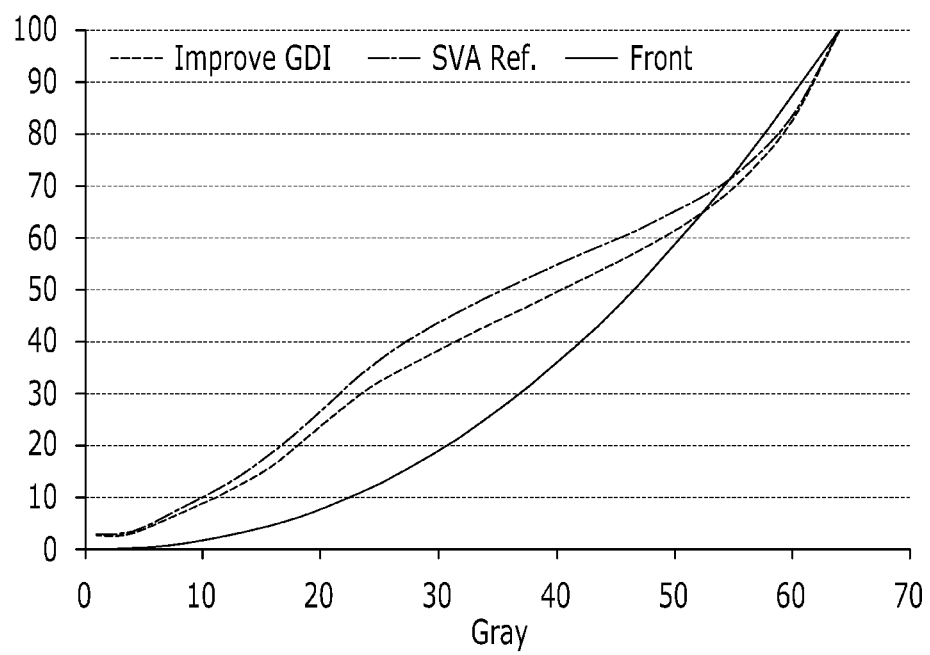
FIG. 17 is a diagram illustrating the gamma curve of the LCD of FIG. 8.

The results are illustrated in FIGS. 16 and 17.

As illustrated in FIG. 16, the LCD illustrated in FIG. 8 of the exemplary embodiment of the invention has transmittance which is reduced as much as about 0.5% but has a visibility index which is reduced as many as about 0.019, as compared with the LCD in which the cut part 271 is not defined in the common electrode 270.

Further, as illustrated in FIG. 17, an agglomeration phenomenon of grayscale may be improved by downing a low grayscale and an intermediate grayscale.

Figure 9:
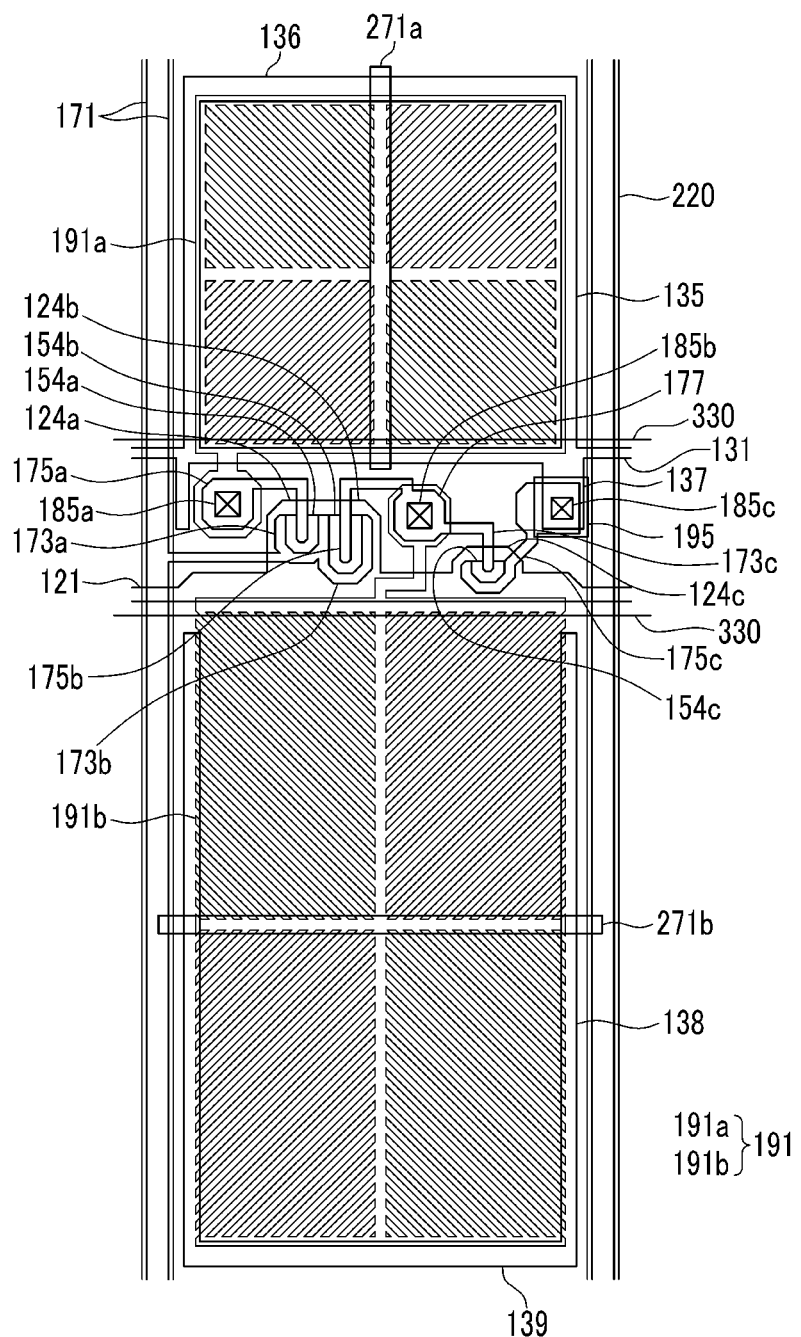

FIG. 9 illustrates that the first cut part 271a of the first sub-pixel electrode 191a is defined only in the vertical axis direction, not having the cruciform shape and the second cut part 271b of the second sub-pixel electrode 191b is defined only in the horizontal axis direction, when viewed from the top.

The following experiment was performed to measure the change in transmittance and visibility of the LCD as illustrated in FIG. 9.

When viewing from the top, the change in transmittance and visibility was measured by comparing the LCD in which the first cut part 271a of the first sub-pixel electrode 191a of FIG. 9 is defined only in the vertical axis direction, not having the cruciform shape and the second cut part 271b of the second sub-pixel electrode 191b is defined only in the horizontal axis with the LCD in which the cut part 271 is not defined in the common electrode 270.

Figure 18:
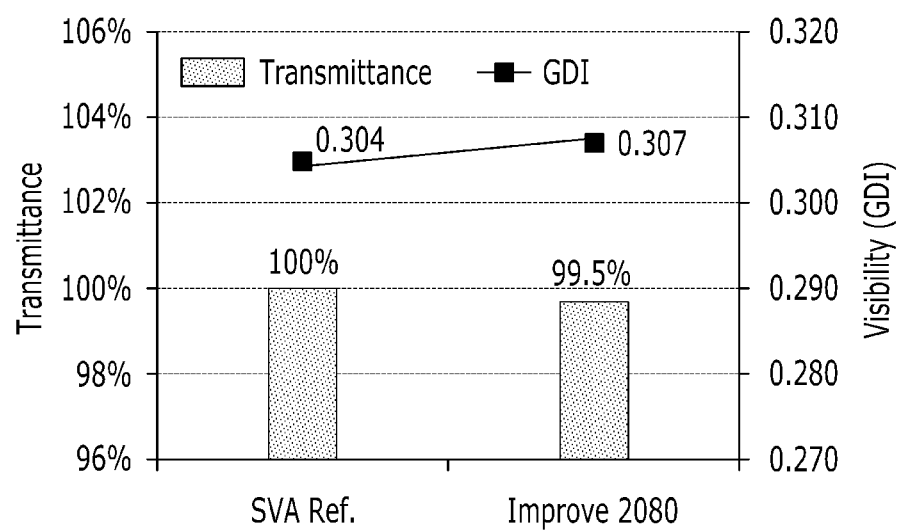
FIG. 18 is a graph illustrating the result obtained by measuring the transmittance and the visibility of the LCD of FIG. 9.
Figure 19:
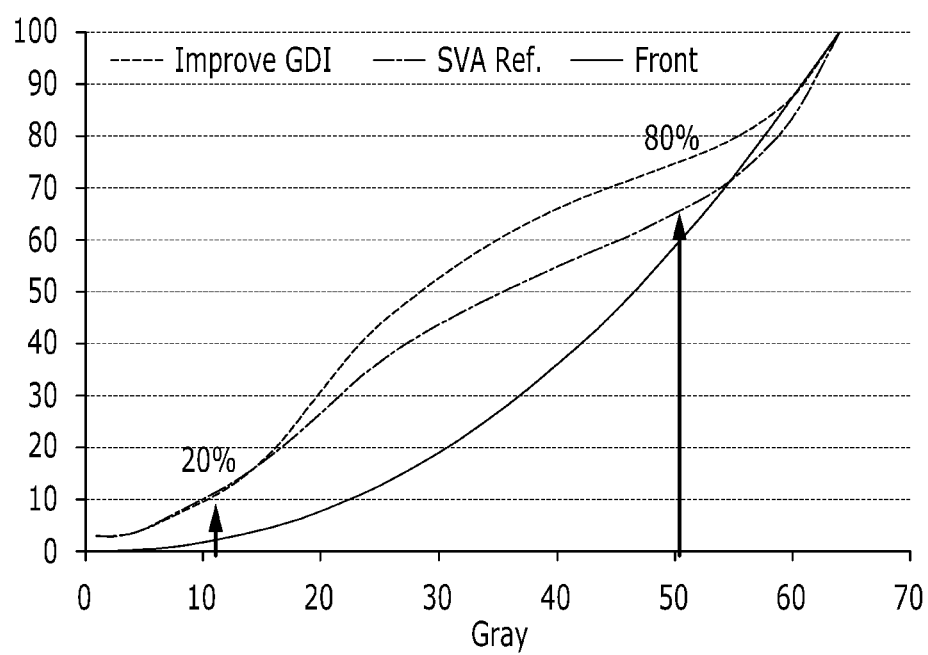
FIG. 19 is a diagram illustrating the gamma curve of the LCD of FIG. 9.

The results are illustrated in FIGS. 18 and 19.

As illustrated in FIG. 18, the LCD illustrated in FIG. 9 of the exemplary embodiment of the invention has transmittance which is reduced as much as about 0.5% but has a visibility index which is increased as many as about 0.003, as compared with the LCD in which the cut part 271 is not defined in the common electrode 270.

Further, as illustrated in FIG. 19, the viewing angle may be improved by reducing the luminance of grayscale as much as about 20% and increasing the luminance of grayscale as much as about 80%.

Figure 10:
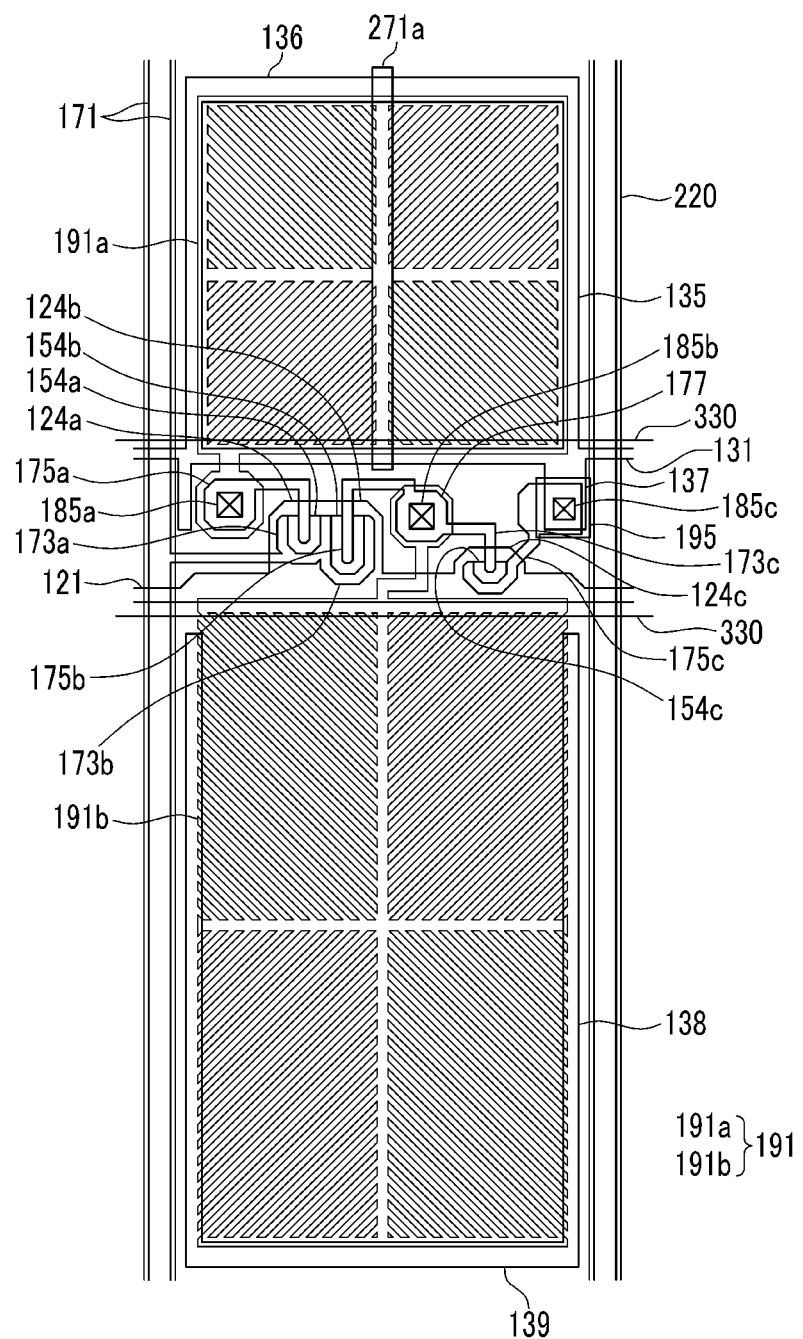

According to another exemplary embodiment of the invention, FIG. 10 illustrates that when viewed from the top, the first cut part 271a of the first sub-pixel electrode 191a is defined only in the vertical axis direction, not having the cruciform shape and the second cut part 271b of the second sub-pixel electrode 191b is not present.

Figure 11:
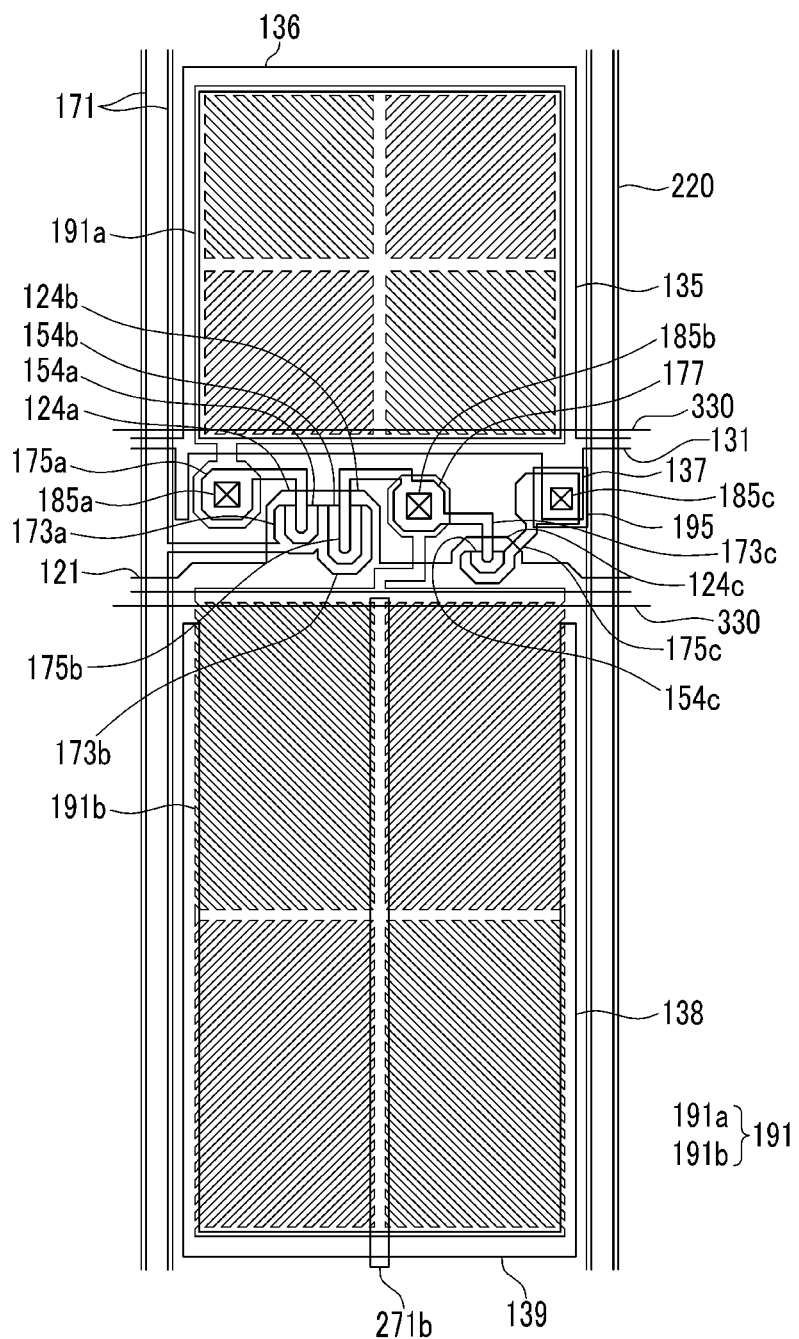

FIG. 11 illustrates that there is no first cut part 271a of the first sub-pixel electrode 191a and when viewed from the top, the second cut part 271b of the second sub-pixel electrode 191b is defined only in the vertical axis direction.

Figure 12:
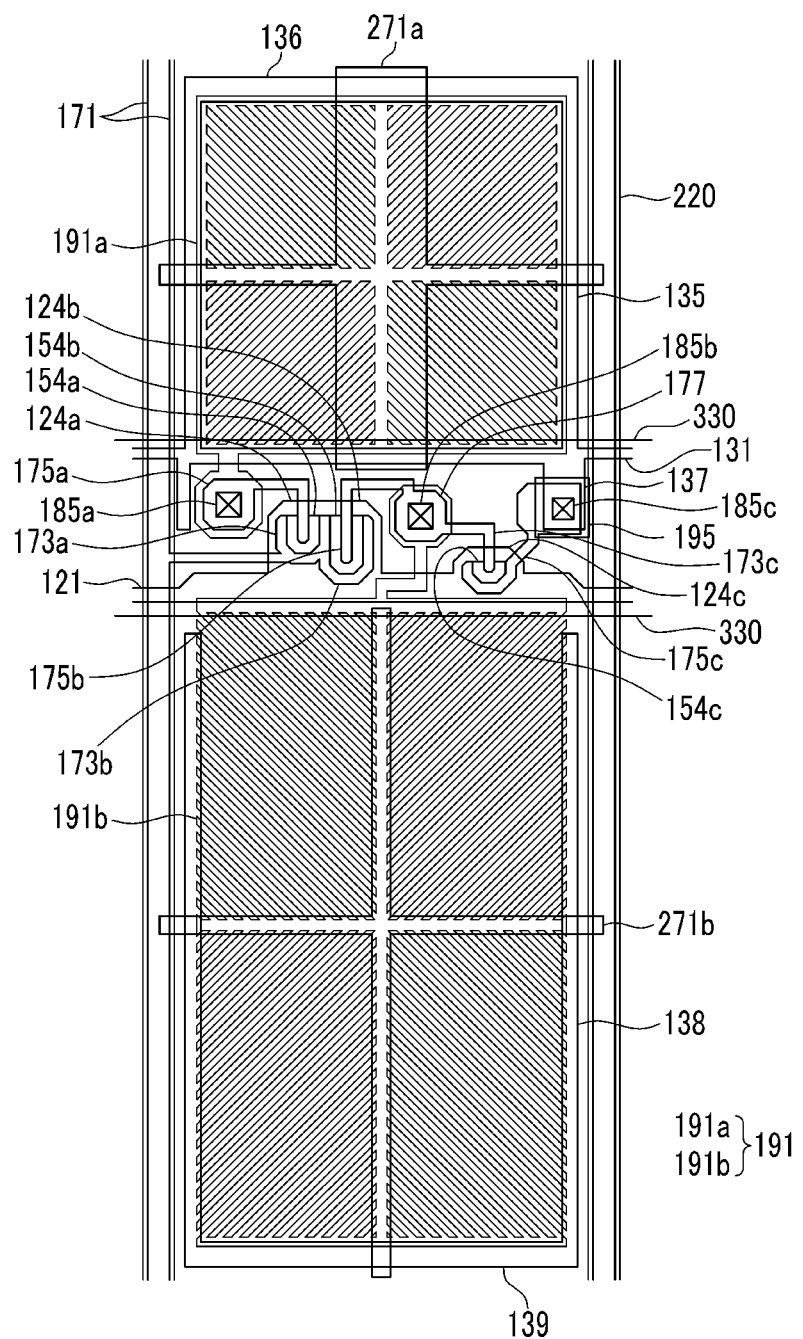

FIG. 12 illustrates that when viewed from the top, the first cut part 271a of the first sub-pixel electrode 191a has the cruciform shape but the width of the cut part 271a of the vertical axis direction is thicker than the cut part 271a of the horizontal axis direction and the second cut part 271b of the second sub-pixel electrode 191b has the cruciform shape.

Figure 13:
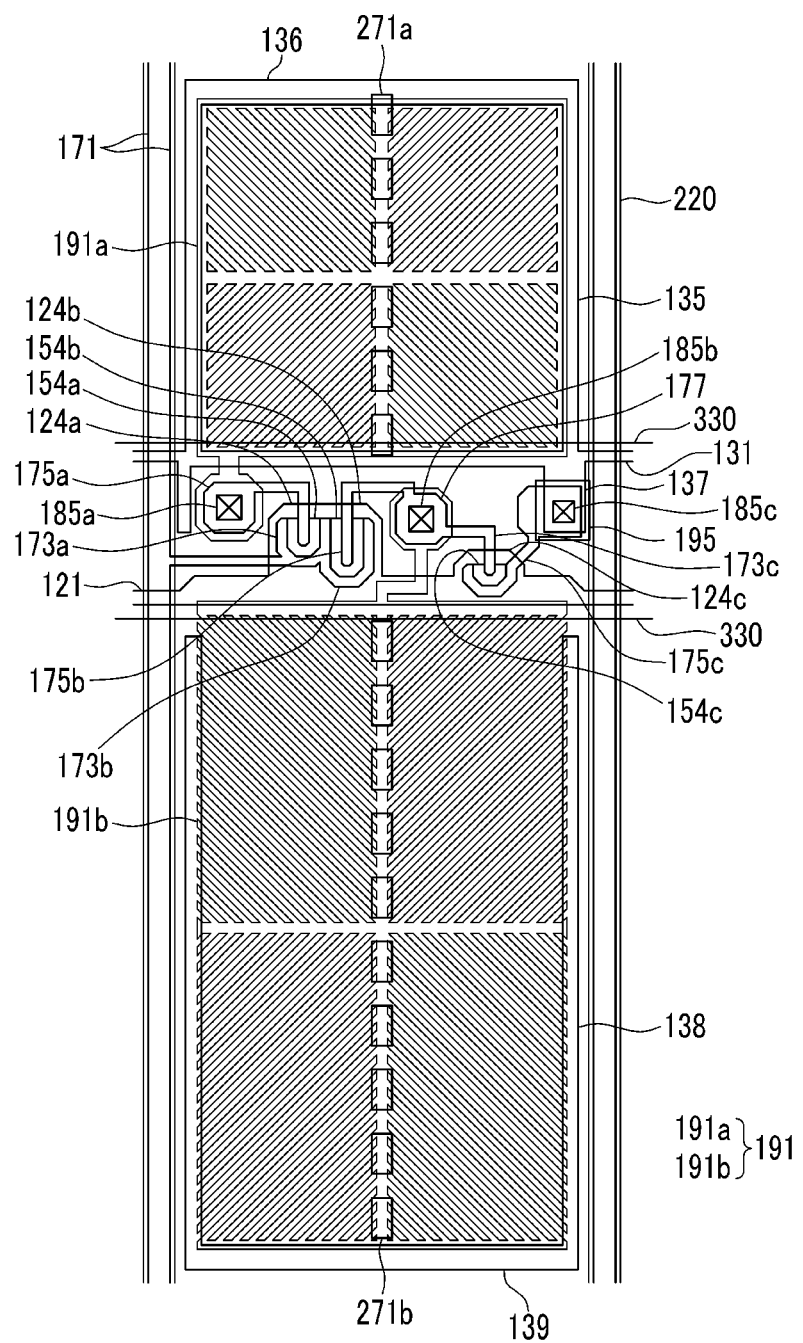

FIG. 13 illustrates that when viewing from the top, the first cut part 271a of the first sub-pixel electrode 191a has a stepping-stone shape, not having the cruciform shape and the second cut part 271b of the second sub-pixel electrode 191b also has a stepping-stone shape in the vertical axis direction. That is, the first cut part 271a of the first sub-pixel electrode 191a may include a plurality of discrete sub-openings arranged along the vertical axes.

The liquid crystal layer 3 interposed between the lower panel 100 and the upper panel 200 includes the liquid crystal molecule 31 and the polymer having a negative dielectric anisotropy. The liquid crystal molecule 31 has the pretilt by the polymer so that the major axis thereof is approximately parallel with a direction toward a middle portion of the openings 271a and 271b of the common electrode 270 having the cruciform shape from four portions, at which edges extending in different directions of each of the sub-pixel electrodes 191a and 191b meet each other, by the cut parts 271a and 271b of the common electrode and the edges of the sub-pixel electrodes 191a and 191b and are aligned to be vertical to the surface of the two display panels 100 and 200. Therefore, each of the first and second sub-pixels has the four sub-pixel regions in which the pretilt direction of the liquid crystal are different from each other.

In the case of the LCD according to the exemplary embodiment of the invention, the cut part is defined in the common electrode, but may be defined in at least one of the pixel electrode, which is the field generating electrode, and the common electrode. In detail, the cut part may be defined in the pixel electrode and may also be in both of the pixel electrode and the common electrode.

Unlike the LCD according to the exemplary embodiments of the invention as described above, in the case of the LCD according to other exemplary embodiments of the invention, a plurality of basic regions of the field generating electrode described with reference to FIG. 4 may be provided in one pixel region.

As set forth above, according to the LCD according to the exemplary embodiments of the invention, the slit is provided so that the cruciform stem portion and the fine branch portion extending from the stem portion is disposed in the pixel electrode and the common electrode is patterned at the position symmetrical to the stem portion of the pixel electrode, thereby making the visibility and the transmittance excellent, reducing the texture, and improving the color losing phenomenon and the agglomeration phenomenon of grayscale.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display, comprising:
a first substrate;
a plurality of pixel electrodes disposed on the first substrate and each including a first sub-pixel electrode and a second sub-pixel electrode, wherein each of the first and second sub-pixel electrodes includes:
a cruciform stem part; and
a plurality of fine branch parts which extends from the cruciform stem part;
a second substrate facing the first substrate;
a common electrode disposed on the second substrate, and an opening part defined in the common electrode and corresponding to the cruciform stem parts of the plurality of pixel electrodes; and
a liquid crystal layer interposed between the first substrate and the second substrate,
wherein the opening part extends to protrude more than a boundary of the pixel electrode.

2. The liquid crystal display of claim 1, further comprising:
a first alignment layer disposed on the first substrate; and
a second alignment layer disposed on the second substrate,
wherein at least one of the first alignment layer, the second alignment layer and the liquid crystal layer includes a photopolymerization material.

3. The liquid crystal display of claim 1, wherein:
the opening part defined in the common electrode includes:
a first opening corresponding to the cruciform stem part of the first sub-pixel electrode, and
a second opening corresponding to the cruciform stem part of the second sub-pixel electrode.

4. The liquid crystal display of claim 1, wherein:
the opening part is only vertically defined, corresponding to a vertical axis of the cruciform stem part of the first sub-pixel electrode.

5. The liquid crystal display of claim 1, wherein:
the opening part is only vertically defined, corresponding to a vertical axis of the cruciform stem part of the second sub-pixel electrode.

6. The liquid crystal display of claim 3, wherein:
the first opening and the second opening each have a cruciform shape corresponding to the cruciform stem parts of the first and second sub-pixel electrodes, respectively.

7. The liquid crystal display of claim 3, wherein:
the first opening is only vertically defined corresponding to a vertical axis of the cruciform stem part of the first sub-pixel electrode, and
the second opening has a cruciform shape corresponding to the cruciform stem part of the second sub-pixel electrode.

8. The liquid crystal display of claim 3, wherein:
the first opening and the second opening are only vertically defined, corresponding to vertical axes of the cruciform stem parts of the first and second sub-pixel electrodes, respectively.

9. The liquid crystal display of claim 3, wherein:
the first opening is only vertically defined, corresponding to a vertical axis of the cruciform stem part of the first sub-pixel electrode, and
a second opening is only horizontally defined, corresponding to a horizontal axis of the cruciform stem part of the second sub-pixel electrode.

10. The liquid crystal display of claim 3, wherein:
the first opening and the second opening each has a cruciform shape corresponding to the cruciform stem parts of the first sub-pixel electrode and the second sub-pixel electrode, respectively, and
for one of the first and second openings, a width of the one opening along the horizontal axis, taken perpendicular to an elongation direction of the one opening along the horizontal axis, and a width of the one opening along a vertical axis, taken perpendicular to an elongation direction of the one opening along the vertical axis, are different from each other.

11. The liquid crystal display of claim 10, wherein:
the first opening having the cruciform shape corresponds to the cruciform stem part of the first sub-pixel electrode,
the width of the first opening along the vertical axis is larger than the width of the first opening along the horizontal axis, and
the second opening having the cruciform shape corresponds to the cruciform stem part of the second sub-pixel electrode.

12. The liquid crystal display of claim 3, wherein:
the first opening and the second opening each includes a plurality of discrete sub-openings arranged along vertical axes of the cruciform stem parts of the first and second sub-pixel electrodes, respectively.

13. The liquid crystal display of claim 3, wherein:
widths of the first opening and the second opening, respectively taken perpendicular to an elongated direction of the first opening and the second opening, are about three times smaller than a cell interval of the liquid crystal layer.

14. The liquid crystal display of claim 13, wherein:
the widths of the first opening and the second opening are about 2 micrometers to about 5 micrometers.

15. The liquid crystal display of claim 1, wherein:
a basic region of the first sub-pixel electrode or the second sub-pixel electrode is plural in one pixel.

16. The liquid crystal display of claim 1, wherein the opening part extends past a terminal side edge defining the stem portion of the corresponding cruciform stem part.

17. The liquid crystal display of claim 16, wherein the opening part exposes the terminal side edge defining the corresponding pixel electrode.

* * * * *